United States Patent
Safary et al.

(10) Patent No.: US 10,710,239 B2
(45) Date of Patent: Jul. 14, 2020

(54) INTELLIGENT CONTROL CODE UPDATE FOR ROBOTIC PROCESS AUTOMATION

(71) Applicant: BANK OF AMERICA CORPORATION, Charlotte, NC (US)

(72) Inventors: Jigesh Rajendra Safary, Mumbai (IN); Krishna Rangarao Mamadapur, Pune (IN); Gyanendra Mohan Sinha, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 7 days.

(21) Appl. No.: 16/184,746

(22) Filed: Nov. 8, 2018

(65) Prior Publication Data
US 2020/0147791 A1 May 14, 2020

(51) Int. Cl.
| | |
|---|---|
| *G06F 9/44* | (2018.01) |
| *B25J 9/16* | (2006.01) |
| *G05B 19/4155* | (2006.01) |
| *G06F 8/65* | (2018.01) |
| *G06N 20/00* | (2019.01) |

(52) U.S. Cl.
CPC ........ *B25J 9/1602* (2013.01); *G05B 19/4155* (2013.01); *G06F 8/65* (2013.01); *G06N 20/00* (2019.01); *B25J 9/1605* (2013.01); *G05B 2219/40528* (2013.01)

(58) Field of Classification Search
CPC ............................. B25J 9/1602; B25J 9/163
USPC ................ 717/124–140, 168–174, 168–140; 706/45–50
See application file for complete search history.

(56) References Cited

U.S. PATENT DOCUMENTS

| | | | |
|---|---|---|---|
| 5,586,218 A * | 12/1996 | Allen | G06N 3/004 706/12 |
| 5,600,789 A | 2/1997 | Parker et al. | |
| 5,905,856 A | 5/1999 | Ottensooser | |
| 6,360,332 B1 | 3/2002 | Weinberg et al. | |
| 6,532,023 B1 | 3/2003 | Schumacher et al. | |
| 6,587,969 B1 | 7/2003 | Weinberg et al. | |
| 6,850,252 B1 * | 2/2005 | Hoffberg | G06K 9/00369 348/E7.061 |
| 7,454,660 B1 | 11/2008 | Kolb et al. | |
| 7,543,189 B2 | 6/2009 | Fichter et al. | |

(Continued)

OTHER PUBLICATIONS

Ferrolho et al, "Intelligent Control and Integration Software for Flexible Manufacturing Cells", IEEE, pp. 3-11 (Year: 2007).*

(Continued)

*Primary Examiner* — Anil Khatri
(74) *Attorney, Agent, or Firm* — Michael A. Springs; Moore & Van Allen PLLC; Anup Shrinivisan Iyer

(57) ABSTRACT

Systems, computer program products, and methods are described herein for intelligent control code update for robotic process automation. The present invention is configured to retrieve execution logs associated with robotic process automation (RPA) sessions, wherein the execution logs comprises exceptions. Next, the present invention is configured to initiate machine learning algorithms configured to process the one or more execution logs and classify the exceptions into predetermined classes. Next, the present invention is configured to deploy automated exception handling subroutines to address the exceptions based on at least classifying the exceptions into the predetermined classes.

20 Claims, 3 Drawing Sheets

(56) References Cited

U.S. PATENT DOCUMENTS

| | | | | |
|---|---|---|---|---|
| 7,882,055 | B2* | 2/2011 | Estes | G06Q 50/22 |
| | | | | 706/52 |
| 7,912,717 | B1* | 3/2011 | Galick | G06K 9/6297 |
| | | | | 704/240 |
| 8,015,143 | B2* | 9/2011 | Estes | G06N 5/022 |
| | | | | 706/52 |
| 8,307,435 | B1* | 11/2012 | Mann | G06F 21/566 |
| | | | | 714/38.1 |
| 8,321,858 | B1* | 11/2012 | Marmaros | G06F 8/65 |
| | | | | 717/173 |
| 8,397,222 | B2* | 3/2013 | Warren | G06F 8/41 |
| | | | | 717/136 |
| 8,418,137 | B2* | 4/2013 | Hoche | G06F 9/3017 |
| | | | | 717/121 |
| 8,600,551 | B2* | 12/2013 | Itkowitz | G09B 23/285 |
| | | | | 700/245 |
| 8,667,457 | B2* | 3/2014 | Swarna | G07F 17/32 |
| | | | | 717/100 |
| 8,719,796 | B2* | 5/2014 | Rosu | G06F 11/302 |
| | | | | 717/128 |
| 9,224,096 | B2* | 12/2015 | Oppenheimer | H04W 4/029 |
| 9,676,098 | B2* | 6/2017 | Hemken | B25J 9/163 |
| 9,817,967 | B1* | 11/2017 | Shukla | G06F 21/52 |
| 9,928,106 | B2* | 3/2018 | Hosabettu | G06F 3/0482 |
| 10,089,586 | B2* | 10/2018 | Vestal | G06Q 10/063114 |
| 10,235,192 | B2* | 3/2019 | Hall | G06N 20/00 |
| 10,270,644 | B1* | 4/2019 | Valsecchi | H04L 41/0681 |
| 10,361,802 | B1* | 7/2019 | Hoffberg-Borghesani | |
| | | | | H04N 21/4755 |
| 10,518,409 | B2* | 12/2019 | Oleynik | G05B 19/42 |
| 2004/0003325 | A1 | 1/2004 | Muller et al. | |
| 2004/0041827 | A1 | 3/2004 | Bischof et al. | |
| 2004/0073886 | A1 | 4/2004 | Irani | |
| 2004/0078692 | A1 | 4/2004 | Jackson et al. | |
| 2005/0166094 | A1 | 7/2005 | Blackwell et al. | |
| 2006/0085681 | A1 | 4/2006 | Feldstein et al. | |
| 2006/0253742 | A1 | 11/2006 | Elenburg et al. | |
| 2006/0259499 | A1 | 11/2006 | Moulckers et al. | |
| 2008/0072100 | A1 | 3/2008 | Okada | |
| 2008/0256506 | A1 | 10/2008 | Chaar et al. | |
| 2008/0256516 | A1 | 10/2008 | Chaar et al. | |
| 2009/0132723 | A1 | 5/2009 | Schneider | |
| 2009/0138956 | A1 | 5/2009 | Schneider | |
| 2009/0177692 | A1 | 7/2009 | Chagoly et al. | |
| 2012/0266142 | A1 | 10/2012 | Bokhari | |
| 2013/0111444 | A1 | 5/2013 | Jones | |
| 2013/0111445 | A1 | 5/2013 | Jones | |
| 2013/0219220 | A1 | 8/2013 | Kraus et al. | |
| 2014/0040347 | A1 | 2/2014 | Jia et al. | |
| 2015/0128281 | A1 | 5/2015 | Muthurajan et al. | |
| 2017/0052824 | A1 | 2/2017 | Sharma et al. | |

OTHER PUBLICATIONS

Gupta et al, "Intelligent control of robotic manipulators: experimental study using neural networks", Mechatronics, Elsevier Science Ltd., pp. 289-305 (Year: 2000).*

Blakeley et al, "Updating Derived Relations: Detecting Irrelevant and Autonomously Computable Updates", ACM, pp. 369-400 (Year: 1989).*

Li et al, "An Application of Machine Learning in the Criterion Updating of Diagnosis Cancer", IEEE, pp. 187-190 (Year: 2005).*

Steinkra et al, "Using GPUs for Machine Learning Algorithms", IEEE, pp. 1-6 (Year: 2005).*

Chen et al, "Adaptive Multi-versioning for OpenMP Parallelization via Machine Learning", IEEE, pp. 907-912 (Year: 2009).*

Weide et al, "Versioning for End-to-End Machine Learning Pipelines", ACM, pp. 1-9 (Year: 2017).*

Marquardt, "Patterns for Software Release Versioning", ACM, pp. 1-13 (Year: 2010).*

* cited by examiner

INTELLIGENT CONTROL CODE UPDATE FOR ROBOTIC PROCESS AUTOMATION

FIELD OF THE INVENTION

The present invention embraces a system for intelligent control code update for robotic process automation.

BACKGROUND

Entities are beginning to integrate robotic process automation (RPA) together with cognitive technologies such as speech recognition, natural language processing, and machine learning to automate perpetual and judgement-based tasks. This integration of cognitive technologies and RPA is extending automation to new areas and can help companies become more efficient and agile as they move down the path of becoming fully digital.

However, there is a need for an intelligent system to process exceptions generated by multiple RPAs and update incorrect and/or inefficient control code for the same.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for intelligent control code update for robotic process automation is presented. The system comprising: at least one non-transitory storage device; and at least one processing device coupled to the at least one non-transitory storage device, wherein the at least one processing device is configured to: electronically retrieve one or more execution logs associated with one or more robotic process automation (RPA) sessions, wherein the one or more execution logs comprises one or more exceptions; initiate one or more machine learning algorithms configured to process the one or more execution logs; classify the one or more exceptions into one or more predetermined classes based on at least initiating the one or more machine learning algorithms on the one or more execution logs; and deploy one or more automated exception handling subroutines to address the one or more exceptions based on at least classifying the one or more exceptions into the one or more predetermined classes.

In some embodiments, addressing the one or more exceptions further comprises deploying an update to a software and/or a firmware code associated with at least one of the one or more RPA sessions.

In some embodiments, the at least one processing device is further configured to: retrieve at least a portion of the one or more execution logs; retrieve the one or more exceptions associated with at least the portion of the one or more execution logs; electronically receive, from a user device, a user input assigning one or more classification labels to the one or more exceptions associated with at least the portion of the one or more execution logs; and initiate a training session associated with the one or more machine learning algorithms based on at least the one or more exceptions associated with at least the portion of the one or more execution logs and the one or more classification labels.

In some embodiments, each of the one or more automated exception handling subroutines is associated with the one or more predetermined classes.

In some embodiments, the at least one processing device is further configured to: retrieve the one or more execution logs from the one or more RPA sessions; store the one or more execution logs in a secure database; and transmit control signals configured to initiate one or more reporting subroutines based on at least storing the one or more execution logs in the secure database.

In some embodiments, the at least one processing device is further configured to: determine a generation of at least one of the one or more execution logs by at least one of the one or more RPA sessions; electronically receive an indication of the generation of at least one of the one or more execution logs; dynamically retrieve the generated at least one of the one or more execution logs; store the generated at least one of the one or more execution logs in the secure database; and transmit control signals configured to dynamically initiate the one or more reporting subroutines based on at least storing the generated at least one of the one or more execution logs in the secure database.

In some embodiments, the one or more initiated reporting subroutines are configured to display on a user device, a first dashboard page comprising a first graphical representation indicating a total number of exceptions arising from each RPA session during a predetermined time period based on at least the retrieved one or more execution logs.

In some embodiments, the one or more initiated reporting subroutines are configured to display on the user device, a second dashboard page comprising a second graphical representation indicating one or more exception types associated with the one or more exceptions based on at least the retrieved one or more execution logs.

In another aspect, a computer implemented method for intelligent control code update for robotic process automation is presented. The method comprising: electronically retrieving one or more execution logs associated with one or more robotic process automation (RPA) sessions, wherein the one or more execution logs comprises one or more exceptions; initiating one or more machine learning algorithms configured to process the one or more execution logs; classifying the one or more exceptions into one or more predetermined classes based on at least initiating the one or more machine learning algorithms on the one or more execution logs; and deploying one or more automated exception handling subroutines to address the one or more exceptions based on at least classifying the one or more exceptions into the one or more predetermined classes.

In yet another aspect, a computer program product for intelligent control code update for robotic process automation is presented. The computer program product comprising a non-transitory computer-readable medium comprising code causing a first apparatus to: electronically retrieve one or more execution logs associated with one or more robotic process automation (RPA) sessions, wherein the one or more execution logs comprises one or more exceptions; initiate one or more machine learning algorithms configured to process the one or more execution logs; classify the one or more exceptions into one or more predetermined classes based on at least initiating the one or more machine learning algorithms on the one or more execution logs; and deploy one or more automated exception handling subroutines to address the one or more exceptions based on at least classifying the one or more exceptions into the one or more predetermined classes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
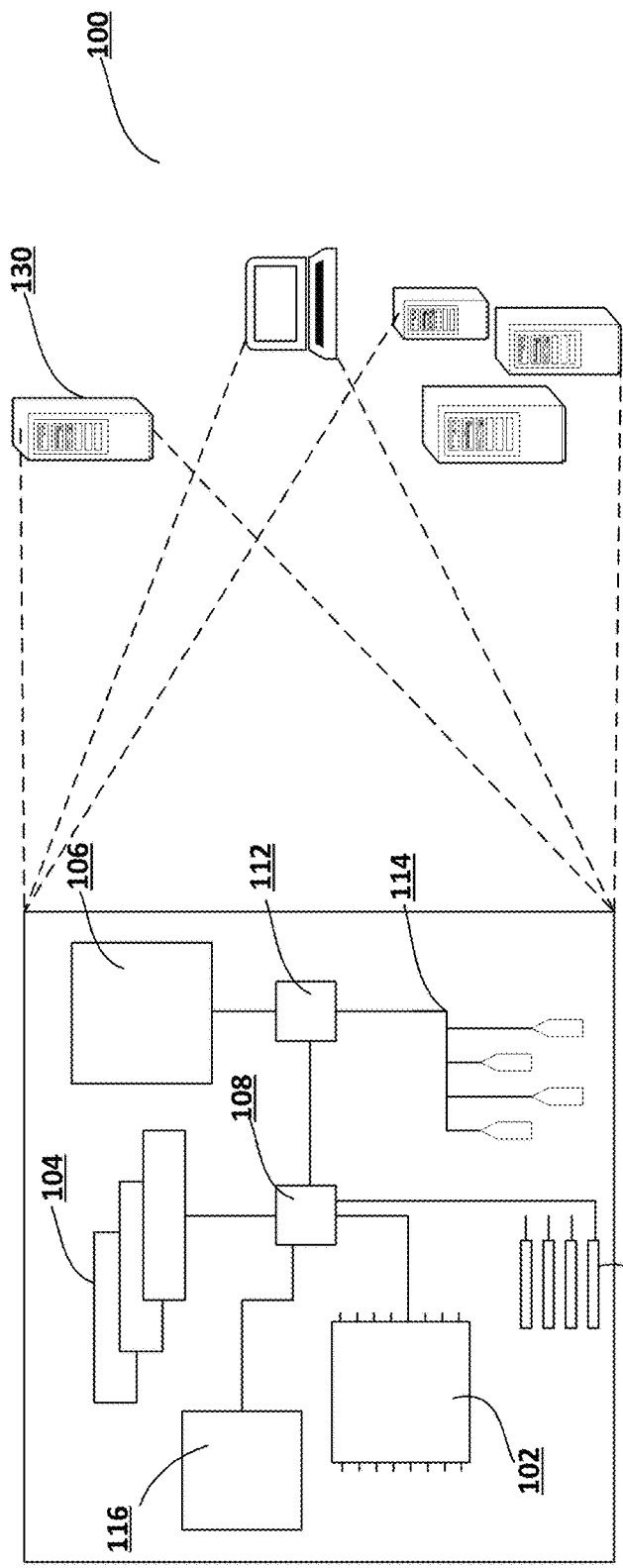
Figure 1:
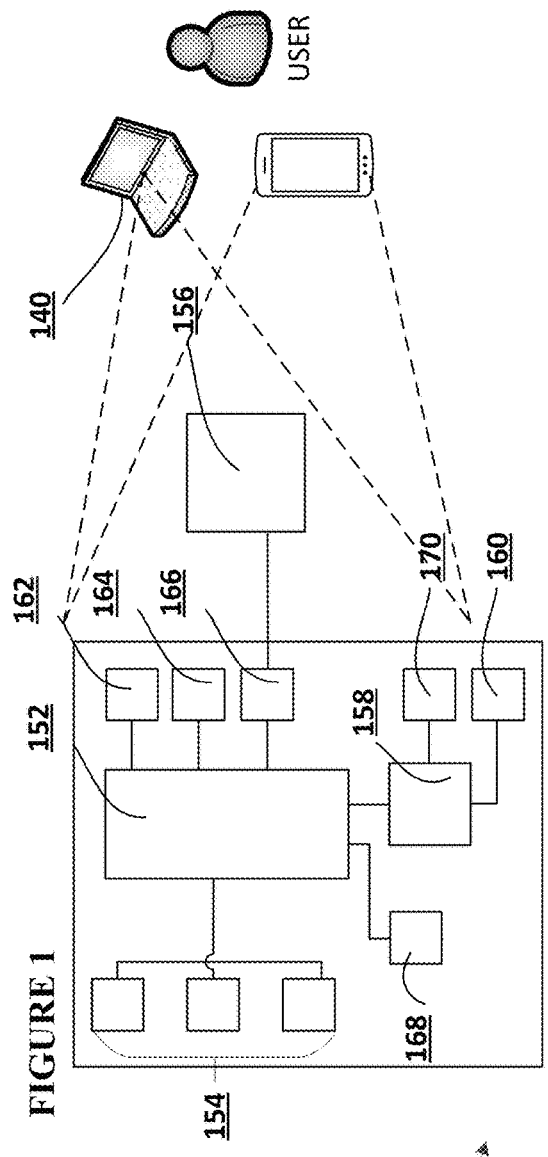
Figure 1:
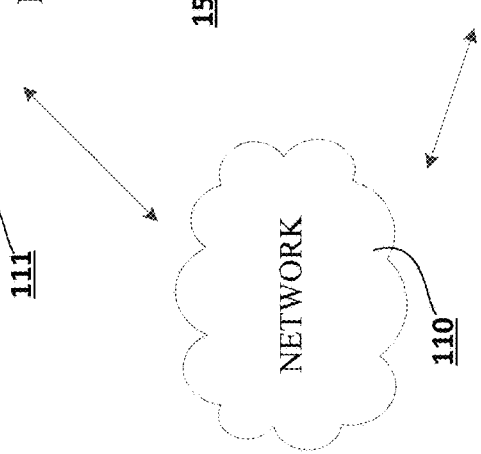
Figure 2:
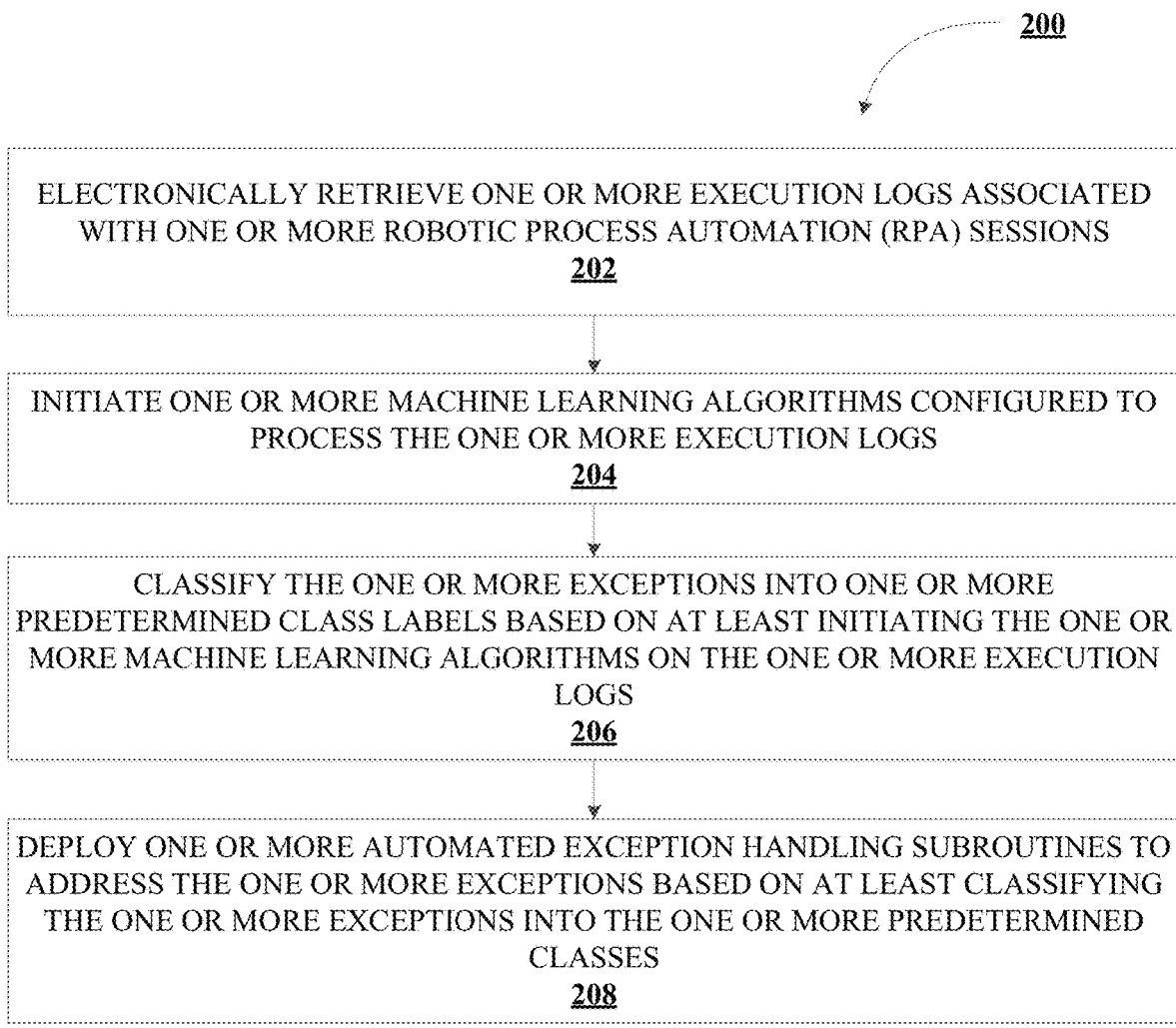
Figure 3:
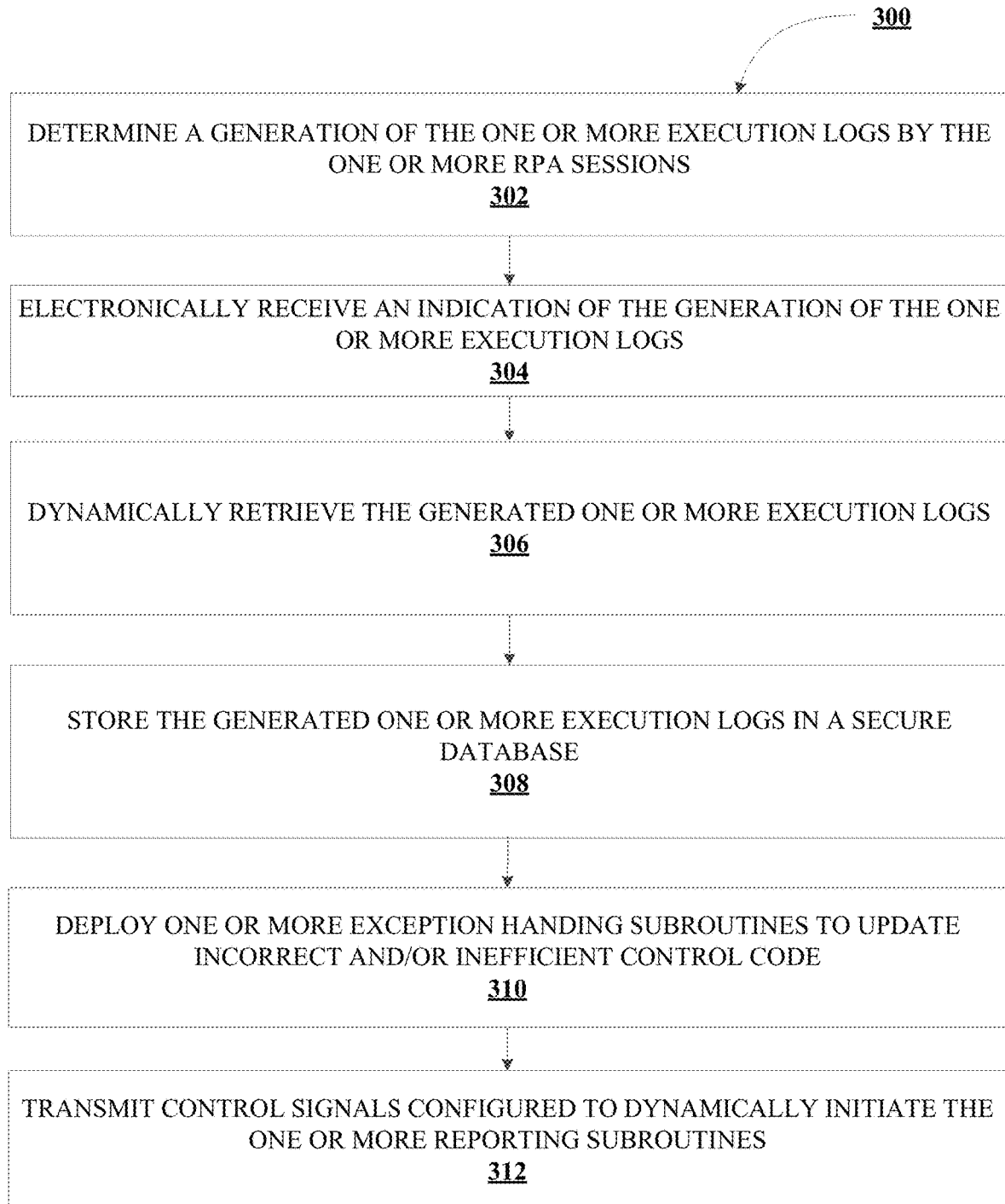

Having thus described embodiments of the invention in general terms, reference will now be made the accompanying drawings, wherein:

FIG. 1 presents an exemplary block diagram of the system environment for intelligent control code update for robotic process automation;

FIG. 2 illustrates a process flow for intelligent control code update for robotic process automation, in accordance with an embodiment of the invention; and FIG. 3 illustrates a process flow for storing and manipulating the exceptions in the execution logs generated by the RPA sessions, in accordance to an embodiment of the inventions.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

FIG. 1 presents an exemplary block diagram of the system environment 100 for intelligent control code update for robotic process automation. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In Robotic Process Automation (RPA), a computer system or robot may mimic the actions of a human being in order to perform a computer-based task. In other words, RPA can be used to interact with application software (or application, for short) through its user interface, as a human being would do. Therefore it is not necessary to integrate RPA with the existing applications at a programming level, thereby eliminating the difficulties inherent to integration, namely bringing together diverse components. RPA sessions can be hosted as robotic instances having their own virtual workstation, much like a human worker. The robot uses keyboard and mouse like controls to execute actions and automations. Typically, these actions take place in a virtual environment and not on a screen; the robot does not require a physical screen to operate, rather it interprets the screen display electronically. The scalability of modern solutions based on architectures such as these owes much to the advent of virtualization technology, without which the scalability of large deployments would be limited by available capacity to manage physical hardware and by the associated costs. Thus, RPA can be used to automate the execution of repetitive and manually intensive activities. RPA's potential benefits are manifold. They can include reducing costs (by cutting staff), lowering error rates, improving service, reducing turnaround time, increasing the scalability of operations, and improving compliance.

With RPA's ability to automate high-volume, repeatable tasks, that cross multiple platforms makes it an appealing option to entities. Many entities have integrated multiple RPA sessions into their technological environment. However, while rule-based RPAs have been known to remove the human element from processing repeatable tasks, any exceptions generated by these RPA sessions still require human intervention. There is a need for a system to handle exceptions and ensure that they can be easily identifiable and repairable by the system, and automatically resolved. The present invention provides the functional benefit of providing an intelligent system to not only identify and classify the exceptions, but also to handle the exceptions. This may include, among other options, the ability to determine which, if any, of the RPAs require a software/firmware updates and an interactive dashboard interface capable of representing, graphically, the exceptions generated by the RPA sessions.

Exceptions can broadly be classified into two main forms: business exceptions and system exceptions. Business exceptions occur when established rules are broken. This tends to happen when data or inputs to the RPA does not conform to business or application criteria. In other words, business exceptions are the implementation of business rules that exist within a process to be automated using an RPA session. System exceptions occur in technical situations. They involve system-based events like non-responding applications, application crashes or new screens/changes within an application that were not accounted for or captured during design and development.

FIG. 2 illustrates a process flow for intelligent control code update for robotic process automation 200, in accordance with an embodiment of the invention. As shown in block 202, the process flow includes electronically retrieving one or more execution logs associated with one or more robotic process automation (RPA) sessions. Each RPA session may be configured to retain a log of one or more actions executed by the RPA. In some embodiments, such execution logs may include one or more exceptions when the RPA is unable to execute at least a portion of an action. When an RPA session determines such an exception, the RPA session may be configured to record the exception in the execution log. In some embodiments, when an RPA session detects an exception, the RPA session may be configured to circumvent the exception and continue executing other actions. However, in some embodiments, certain exceptions may cause the RPA session to crash and stop execution of any additional actions. Based on the exception detected, the RPA session may be configured to determine exception information such as exception type, metadata associated with the exception, a time instant associated with the exception, information associated with the RPA session, and/or the like. In response to determining the exception information, the RPA session may be configured to store the exceptions and the associated exception information in the execution log. In this way, each RPA session associated in the technology environment may be configured to generate an execution log. The size and complexity of the execution log depends on at least the number of RPA sessions being implemented in the technology environment and the complexity of the actions each RPA session is configured to execute. With entities increasingly applying multiple RPA sessions to their core processes, the execution logs generated by these RPA sessions have become tedious and difficult to manage.

Next, the process flow includes initiating one or more machine learning algorithms configured to process the one or more execution logs, as shown in block 204. The machine learning/modeling techniques used herein may include but are not limited to linear regression, logistic regression, neural networks, support vector machines, decision trees, and their derivatives. In practice, one technique can be used in the research effort to provide insights for another machine learning/modeling technique. Thus, a combination of techniques can be used in the analysis and in the product implementation. Once the machine learning algorithm/modeling structure and method is determined, the algorithm is trained based on the historical exceptions adaptively. The listing of machine learning/modeling structures and techniques listed herein are not exhaustive. Those skilled in the art will appreciate that other predictive modeling structures and techniques may be used in various embodiments. Example predictive modeling structures and techniques may include genetic algorithms, text classifiers, hidden Markov models, self-organizing maps, and dynamic Bayesian analysis.

For purposes of this invention, the machine learning algorithms implemented are supervised. Supervised learning is so named because an analyst acts as a guide to teach the algorithm what conclusions it should come up with. In this regard, the historical execution logs are analyzed by a user associated with an entity, who determines an exception handling subroutine to address each historical exception associated with the historical execution logs. In some embodiments, one exception handling subroutine may be used to address many exception types. In doing so, the employees assign each exception or type of exception a class label. Thus, each predetermined class label indicates an exception handling subroutine to be executed on the RPA session to address the historical exceptions. By labeling the historical exceptions with predetermined labels, the supervised learning methods enable new exceptions to be classified with the predetermined class labels. Once the historical exceptions are assigned a class label, the system may be configured to initiate the training portion of the machine learning algorithms, whereby the machine learning algorithms are tasked with learning a function that maps the historical exceptions to the class labels.

Next, the process flow includes classifying the one or more exceptions into one or more predetermined class labels based on at least initiating the one or more machine learning algorithms on the one or more execution logs, as shown in block 206. Once the machine learning algorithms determines a function that maps the historical exceptions to the class labels, exceptions retrieved from the one or more execution logs are then classified into one or more predetermined classes.

Next, the process flow includes deploying one or more automated exception handling subroutines to address the one or more exceptions based on at least classifying the one or more exceptions into the one or more predetermined classes, as shown in block 208. Each exception handling routine comprises one or more specific set of actions required to address the exceptions. Once the one or more exceptions are classified using the predetermined class labels, the system may be configured to implement the specific set of actions in the exception handling subroutine associated with the predetermined class labels to address the exceptions. In this way, the system may be configured to automate the handling of the exceptions generated by the RPA sessions, removing the need for manual intervention. In some embodiments, each of the one or more automated exception handling subroutines is associated with the one or more predetermined classes.

In some embodiments, the one or more automated exception handling subroutines further comprises deploying an update to a software and/or firmware code associated with at least one of the one or more RPA sessions due to inefficient or incorrect control code. In this regard, the system may be configured to determine which of one or more RPA sessions requires a software update. In doing so, the system may be configured to filter for software updates that use specific requirements. This may include retrieving all security or critical software updates required on the one or more RPA sessions. Next, the system may be configured to create a software update group that contains the software updates. Once the software update group is created, the system may then be configured to determine one or more content distribution points in the technology environment. In response to determining the content distribution points, the system may then be configured to deploy the software update group to the RPA sessions.

In some embodiments, the one or more automated exception handling subroutines further comprises updating process flow associated with at least one of the one or more RPA sessions. In this regard, the system may be configured to compare the exceptions retrieved from the at least one of the one or more RPA sessions against a list of existing exceptions to determine a match. Each existing exception is associated with a specific set of actions to update the process flow. In case of a successful match, the system may be configured to implement a same or similar specific set of actions to update the process flow of the at least one of the one or more RPA sessions. If the exceptions retrieved from the at least one of the one or more RPA sessions does not match any existing exceptions, the system may then be configured to determine whether any of the specific set of actions are capable of updating the process flow. In response to determining at least one of the specific set of actions can be used to update the process flow, the system may be configured to implement the at least one of the specific set of actions to do so. On the other hand, if the system determines that none of the specific set of actions can be used to update the process flow, it is then reported and escalated for further processing.

FIG. 3 illustrates a process flow for storing and manipulating the exceptions in the execution logs generated by the RPA sessions 300, in accordance to an embodiment of the inventions. As shown in block 302, the process flow includes determining a generation of the one or more execution logs by the one or more RPA sessions. Next, the process flow includes electronically receiving an indication of the generation of the one or more execution logs, as shown in block 304. Next, the process flow includes dynamically retrieving the generated one or more execution logs, as shown in block 306. In some embodiments, once generated, the one or more execution logs may be stored in a temporary memory location. In one aspect, the system may be configured to retrieve the generated execution logs in substantially real-time as soon as they are generated by the RPA session. In another aspect, the system may be configured to retrieve the generated execution logs in batches at predetermined periodic time intervals, or when the number of exceptions in each execution log has reached a predetermined number.

Next, the process flow includes storing the generated one or more execution logs in a secure database, as shown in block 308. The execution logs generated by each RPA session may be in varying formats. In such cases, the system may be configured to restructure the execution logs from their initial format when generated into a standardized format. This results in increased data quality, better data integration and reusability, better facilitation of data exchange, and facilitation of regulatory reviews and audits.

Next, the process flow includes deploying one or more exception handling subroutines to update incorrect and/or inefficient control code, as shown in block 310. As described herein, the system may be configured to determine which of one or more RPA sessions requires a software and/or process flow update due to incorrect and/or inefficient control code, or any persisting technical issues with the one or more RPA sessions. These inefficiencies may be due to a number of reasons, including, but not limited to inefficient programming methods, lack of business continuity, incorrect code control framework, or unproductive transition code principles. Once determined, the system may then be configured to deploy the updates to correct for inefficient and/or incorrect code.

Next, the process flow includes transmitting control signals configured to dynamically initiate the one or more reporting subroutines, as shown in block 312. In some embodiments, the one or more initiated reporting subroutines are configured to display on a user device, a first dashboard page comprising a first graphical representation indicating a total number of exceptions arising from each RPA session during a predetermined time period based on at least the retrieved one or more execution logs. In some other embodiments, the one or more initiated reporting subroutines are configured to display on the user device, a second dashboard page comprising a second graphical representation indicating one or more exception types associated with the one or more exceptions based on at least the retrieved one or more execution logs. In some embodiments, a graphical representation may include, but is not limited to dot plots, bar graphs, line graphs, circle graphs, histograms, frequency polygon, and/or the like. By graphically representing the many exceptions, the present invention provides for rapidly accessing the exceptions from each RPA session with in the technology environment and a convenient means for organizing and presenting the information. This also allows the user to understand where most of the exceptions are coming from and why, what are the most number of exceptions, and which task is taking more time.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for intelligent control code update for robotic process automation, the system comprising:
at least one non-transitory storage device; and
at least one processing device coupled to the at least one non-transitory storage device, wherein the at least one processing device is configured to:
electronically retrieve one or more execution logs associated with one or more robotic process automation (RPA) sessions, wherein the one or more execution logs comprises one or more exceptions;
initiate one or more machine learning algorithms configured to process the one or more execution logs;
classify the one or more exceptions into one or more predetermined classes based on at least initiating the one or more machine learning algorithms on the one or more execution logs;
deploy one or more automated exception handling subroutines to address the one or more exceptions based on at least classifying the one or more exceptions into the one or more predetermined classes;
dynamically retrieve the one or more execution logs from the one or more RPA sessions:
store the one or more execution logs in a secure database; and
transmit control signals configured to intiate one or more reporting subroutines based on at least storing the one or more execution logs in the secure database.

2. The system of claim 1, wherein addressing the one or more exceptions further comprises deploying an update to a software and/or a firmware code associated with at least one of the one or more RPA sessions.

3. The system of claim 1, wherein the at least one processing device is further configured to:
retrieve at least a portion of the one or more execution logs;
retrieve the one or more exceptions associated with at least the portion of the one or more execution logs;
electronically receive, from a user device, a user input assigning one or more classification labels to the one or more exceptions associated with at least the portion of the one or more execution logs; and
initiate a training session associated with the one or more machine learning algorithms based on at least the one or more exceptions associated with at least the portion of the one or more execution logs and the one or more classification labels.

4. The system of claim 3, wherein the one or more initiated reporting subroutines are configured to display on the user device, a first dashboard page comprising a first graphical representation indicating a total number of exceptions arising from each RPA session during a predetermined time period based on at least the retrieved one or more execution logs.

5. The system of claim 1, wherein each of the one or more automated exception handling subroutines is associated with the one or more predetermined classes.

6. The system of claim 1, wherein the at least one processing device is further configured to:
determine a generation of at least one of the one or more execution logs by at least one of the one or more RPA sessions;
electronically receive an indication of the generation of at least one of the one or more execution logs;
dynamically retrieve the generated at least one of the one or more execution logs;
store the generated at least one of the one or more execution logs in the secure database; and
transmit control signals configured to dynamically initiate the one or more reporting subroutines based on at least storing the generated at least one of the one or more execution logs in the secure database.

7. The system of claim 1, wherein the one or more initiated reporting subroutines are configured to display on the user device, a second dashboard page comprising a second graphical representation indicating one or more exception types associated with the one or more exceptions based on at least the retrieved one or more execution logs.

8. A computer implemented method for intelligent control code update for robotic process automation, the method comprising:
    electronically retrieving one or more execution logs associated with one or more robotic process automation (RPA) sessions, wherein the one or more execution logs comprises one or more exceptions;
    initiating one or more machine learning algorithms configured to process the one or more execution logs;
    classifying the one or more exceptions into one or more predetermined classes based on at least initiating the one or more machine learning algorithms on the one or more execution logs;
    deploying one or more automated exception handling subroutines to address the one or more exceptions based on at least classifying the one or more exceptions into the one or more predetermined classes;
    dynamically retrieving the one or more execution logs from the one or more RPA sessions:
    storing the one or more execution logs in a secure database; and
    transmitting control signals configured to initiate one or more reporting subroutines based on at least storing the one or more execution logs in the secure database.

9. The computer implemented method of claim 8, wherein addressing the one or more exceptions further comprises deploying an update to a software and/or a firmware code associated with at least one of the one or more RPA sessions.

10. The computer implemented method of claim 8, wherein the method further comprises:
    retrieving at least a portion of the one or more execution logs;
    retrieving the one or more exceptions associated with at least the portion of the one or more execution logs;
    electronically receiving, from a user device, a user input assigning one or more classification labels to the one or more exceptions associated with at least the portion of the one or more execution logs; and
    initiating a training session associated with the one or more machine learning algorithms based on at least the one or more exceptions associated with at least the portion of the one or more execution logs and the one or more classification labels.

11. The computer implemented method of claim 10, wherein the one or more initiated reporting subroutines are configured to display on the user device, a first dashboard page comprising a first graphical representation indicating a total number of exceptions arising from each RPA session during a predetermined time period based on at least the retrieved one or more execution logs.

12. The computer implemented method of claim 8, wherein each of the one or more automated exception handling subroutines is associated with the one or more predetermined classes.

13. The computer implemented method of claim 8, wherein the method further comprises:
    determining a generation of at least one of the one or more execution logs by at least one of the one or more RPA sessions;
    electronically receiving an indication of the generation of at least one of the one or more execution logs;
    dynamically retrieving the generated at least one of the one or more execution logs;
    storing the generated at least one of the one or more execution logs in the secure database; and
    transmitting control signals configured to dynamically initiate the one or more reporting subroutines based on at least storing the generated at least one of the one or more execution logs in the secure database.

14. The computer implemented method of claim 8, wherein the one or more initiated reporting subroutines are configured to display on the user device, a second dashboard page comprising a second graphical representation indicating one or more exception types associated with the one or more exceptions based on at least the retrieved one or more execution logs.

15. A computer program product for intelligent control code update for robotic process automation, the computer program product comprising a non-transitory computer-readable medium comprising code causing a first apparatus to:
    electronically retrieve one or more execution logs associated with one or more robotic process automation (RPA) sessions, wherein the one or more execution logs comprises one or more exceptions;
    initiate one or more machine learning algorithms configured to process the one or more execution logs;
    classify the one or more exceptions into one or more predetermined classes based on at least initiating the one or more machine learning algorithms on the one or more execution logs;
    deploy one or more automated exception handling subroutines to address the one or more exceptions based on at least classifying the one or more exceptions into the one or more predetermined classes;
    dynamically retrieve the one or more execution logs from the one or more RPA sessions;
    store the one or more execution logs in a secure database; and
    transmit control signals configured to initiate one or more reporting subroutines based on at least storing the one or more execution logs in the secure database.

16. The computer program product of claim 15, wherein addressing the one or more exceptions further comprises deploying an update to a software and/or a firmware code associated with at least one of the one or more RPA sessions.

17. The computer program product of claim 15, wherein the first apparatus is further configured to:
    retrieve at least a portion of the one or more execution logs;
    retrieve the one or more exceptions associated with at least the portion of the one or more execution logs;
    electronically receive, from a user device, a user input assigning one or more classification labels to the one or more exceptions associated with at least the portion of the one or more execution logs; and
    initiate a training session associated with the one or more machine learning algorithms based on at least the one or more exceptions associated with at least the portion of the one or more execution logs and the one or more classification labels.

18. The computer program product of claim 15, wherein each of the one or more automated exception handling subroutines is associated with the one or more predetermined classes.

19. The computer program product of claim 15, wherein the first apparatus is further configured to:
- determine a generation of at least one of the one or more execution logs by at least one of the one or more RPA sessions;
- electonically receive an indication of the generation of at least one of the one or more execution logs;
- dynamically retrieve the generated at least one of the one or more execution logs;
- store the generated at least one of the one or more execution logs in the secure database; and
- transmit control signals configured to dynamically initiate the one or more reporting subroutines based on at least storing the generated at least one of the one or more execution logs in the secure database.

20. The computer program product of claim 15, wherein the one or more initiated reporting subroutines are configured to display on a user device, a first dashboard page comprising a first graphical representation indicating a total number of exceptions arising from each RPA session during a predetermined time period based on at least the retrieved one or more execution logs.

\* \* \* \* \*